(12) United States Patent
Handa et al.

(10) Patent No.: US 7,069,782 B2
(45) Date of Patent: Jul. 4, 2006

(54) VEHICLE SPEED SENSOR MOUNTING STRUCTURE FOR A VEHICLE

(75) Inventors: Akio Handa, Saitama (JP); Hiroaki Iguchi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/207,202

(22) Filed: Jul. 30, 2002

(65) Prior Publication Data

US 2003/0033874 A1 Feb. 20, 2003

(30) Foreign Application Priority Data

Aug. 6, 2001 (JP) ............................. 2001-237737

(51) Int. Cl.
*G01P 1/02* (2006.01)
*F16H 57/02* (2006.01)
*B60K 17/00* (2006.01)

(52) U.S. Cl. ..................... 73/494; 73/866.5; 74/606 R; 180/374; 324/207.25

(58) Field of Classification Search ................. 73/493, 73/494, 866.5; 74/12, 606 R; 324/160, 324/207.22, 207.25; 180/170–171, 374; 475/220; D12/160

See application file for complete search history.

(56) References Cited

U.S. PATENT DOCUMENTS

| 1,797,579 | A | * | 3/1931 | Hoffman ........................ 74/12 |
| 3,719,841 | A | * | 3/1973 | Ritsema ..................... 310/155 |
| 4,862,025 | A | * | 8/1989 | Dierker et al. ............ 310/68 B |
| 5,032,790 | A | * | 7/1991 | Johnson ...................... 324/174 |
| 5,067,350 | A | * | 11/1991 | Grillo et al. ................ 73/494 |
| 5,589,767 | A | * | 12/1996 | Akamatsu ................... 324/173 |
| 6,401,568 | B1 | * | 6/2002 | Hauser et al. ............... 74/607 |
| 6,412,368 | B1 | * | 7/2002 | Seki et al. .................... 74/650 |
| 6,523,634 | B1 | * | 2/2003 | Gagnon et al. ............ 180/291 |

FOREIGN PATENT DOCUMENTS

| JP | 61-48366 | 4/1986 |
| JP | 11-115537 A | 4/1999 |

* cited by examiner

*Primary Examiner*—Hezron Williams
*Assistant Examiner*—John Hanley
(74) *Attorney, Agent, or Firm*—Birch, Stewart, Kolasch & Birch, LLP

(57) ABSTRACT

A vehicle speed sensor mounting structure of a vehicle for supporting a vehicle speed sensor. The structure includes a vehicle body for suspending an engine. The engine output is transmitted through a final reduction gear to wheels via an axle. A vehicle speed sensor is mounted on the final reduction gear for detecting rotational speed of a final gear of the final reduction gear, thereby detecting the vehicle speed. The vehicle speed sensor is disposed higher than the center of the axle and near to the outside of the vehicle (vehicle front part) with respect to the center of the axle. With this configuration, flexibility in the mounting of a vehicle speed sensor can be increased and a separate member for protecting the vehicle speed sensor can be omitted. Thus, the number of parts required in the mounting structure can be reduced.

6 Claims, 5 Drawing Sheets

VEHICLE SPEED SENSOR MOUNTING STRUCTURE FOR A VEHICLE

CROSS-REFERENCE TO RELATED APPLICATION

The present application claims priority under 35 U.S.C. §119 to Japanese Patent Application No. 2001-237737, filed on Aug. 6, 2001, the entire contents of which are hereby incorporated by reference.

BACKGROUND OF THE INVENTION

1. Field of the Invention

The present invention relates to a vehicle speed sensor mounting structure for a vehicle for detecting the rotational speed of a final gear of a final reduction gear by a vehicle speed sensor.

2. Description of Background Art

Examples of conventional vehicle speed sensor mounting structures, include:

(1) "apparatus for detecting rotational speed of wheel" disclosed in Japanese Unexamined Utility Model Publication No. Sho-61-48366, and (2) "vehicle speed sensor mounting structure" disclosed in Japanese Unexamined Patent Application Publication No. Hei-11-115537.

According to example (1), as shown in FIG. 1 of the publication, a wheel speed sensor 21 is attached to an axle housing 20, and the rotation of a drive gear 23 is detected by the wheel speed sensor 21.

According to example (2), as shown in FIGS. 1 and 3 of the publication, an engine 16, a transmission 18, and a transfer 20 are mounted on a chassis 4, a supporting part 34 for supporting a rear propeller shaft 32 is provided for the transfer 20, and a reinforcement rib 36 is attached to the supporting part 34. A sensor fitting boss 40 is formed near the supporting part 34 and the reinforcement rib 36 so as to face obliquely downward, and a vehicle speed sensor 38 is attached to the sensor fitting boss 40.

In the apparatus for detecting the rotational speed of a wheel of example (1), however, since the wheel speed sensor 21 is attached to the axle housing 20, a cover for protecting the wheel speed sensor 21 from flying gravel and the like is necessary.

In the structure of fitting the wheel speed sensor of example (2), the vehicle speed sensor 38 is attached to the sensor fitting boss 40 formed near the supporting part 34 and the reinforcement rib 36 so as to face downward. Consequently, although the vehicle speed sensor 38 can be protected from flying gravel and the like from the reinforcement rib 36 side, it is not protected from flying gravel and the like from below.

SUMMARY AND OBJECTS OF THE INVENTION

An object of the present invention, therefore, is to provide a vehicle speed sensor mounting structure, capable of effectively protecting a vehicle speed sensor from flying gravel and other elements that may get thrown up by the wheels when the vehicle is moving.

To achieve the object of the present invention, a vehicle speed sensor mounting structure is provided such that the vehicle speed sensor is protected. Included in the structure is a vehicle body frame for suspending the engine of the vehicle. The engine is connected to a final reduction gear which transmits the output of the engine to wheels via an axle. A vehicle speed detector is mounted on the final reduction gear for detecting rotational speed of a final gear of the final reduction gear, thereby detecting vehicle speed. The vehicle speed sensor is disposed higher than the center of the axle and near to the outside of the vehicle with respect to the center of the axle.

To detect the vehicle speed, the rotational speed of the final gear of the final gear reduction is detected by the vehicle speed sensor. However, when the vehicle speed sensor is disposed lower than the axle center, as in conventional structures, the sensor can be easily hit by small stones and the like, and thus the vehicle speed sensor must be protected. In the present invention, the vehicle speed sensor is disposed higher than the axle center, and thus the vehicle speed sensor can not be so easily hit by small stones and the like.

If the vehicle speed sensor is disposed on the inner side of the mechanism for transmitting power with respect to the center of the axle, as in conventional structures, it is difficult to mount and access. The present invention overcomes this problem by disposing the vehicle speed sensor higher than the axle center and near to the outside of the vehicle with respect to the center of the axle. As such, the vehicle speed sensor can be mounted easily, flexibility in designing of mounting of the vehicle speed sensor can be increased, and a member for protecting the vehicle speed sensor can be omitted. Accordingly, the number of parts required is reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

One embodiment of the invention will be described hereinbelow with reference to the attached drawings. "Front", "rear, "left", "right", "up", and "down" are directions seen from the driver. "Fr", "Rr", "L", and "R" indicate front side, rear side, left side, and right side, respectively.

Figure 1:
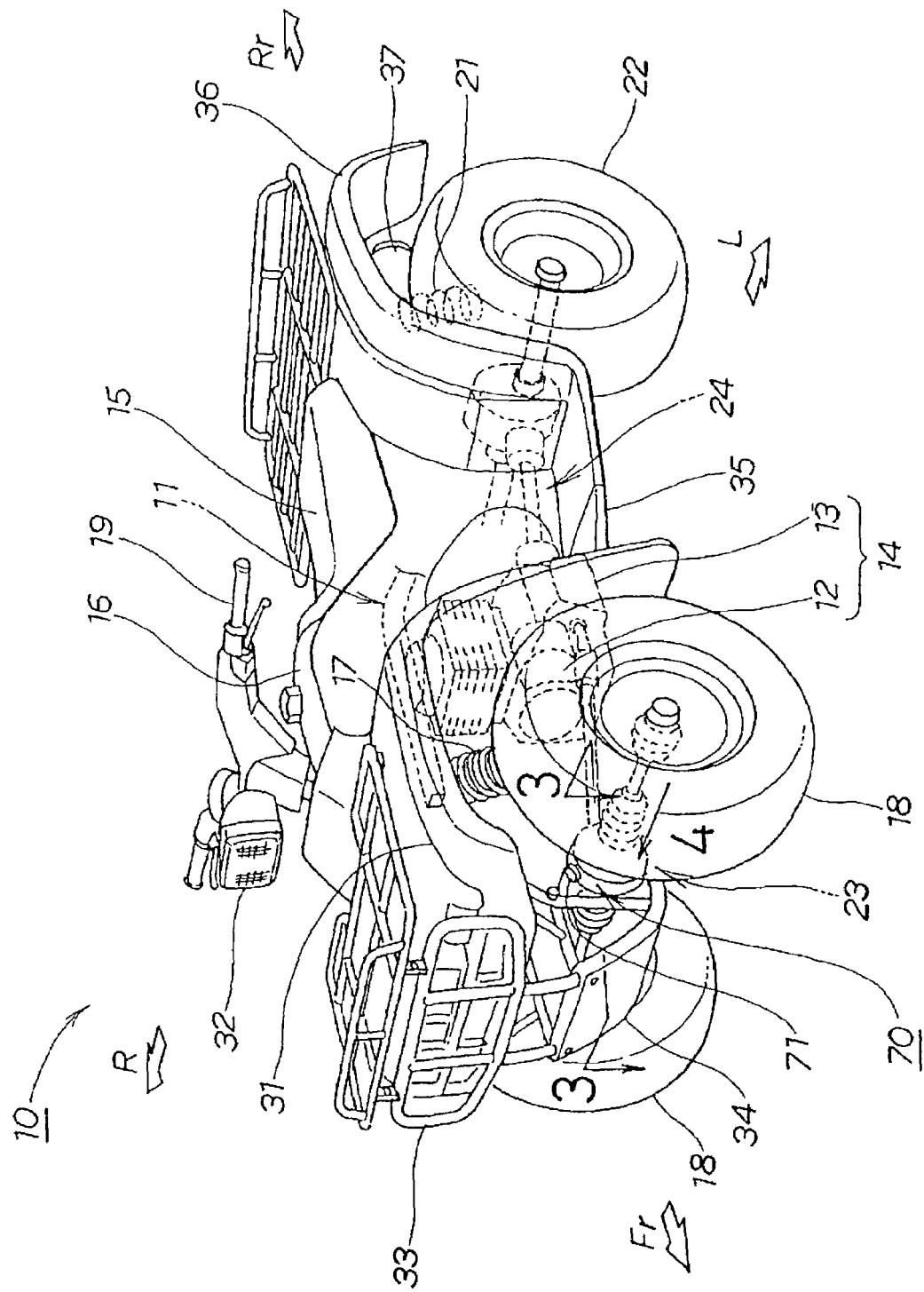
FIG. 1 is a perspective view of a vehicle employing a vehicle speed sensor mounting structure according to the present invention.

FIG. 1 is a perspective view of a vehicle employing a vehicle speed sensor mounting structure according to the present invention. A saddle-riding type vehicle 10 has, as main components, a vehicle body frame 11, a power unit 14 including an engine 12 and a transmission 13 mounted in the center portion of the vehicle body frame 11, a saddle-type seat 15 provided over the power unit 14, and a fuel tank 16 disposed in the front part of the saddle-type seat 15. Front wheels 18 and 18 are rotatably attached to the front side parts of the vehicle body frame 11 via right and left suspending mechanisms 17 and 17 (the suspending mechanism 17 on the deep side is not shown), and a steering wheel 19 is provided for steering the front wheels 18 and 18. Rear wheels 22 and 22 (the rear wheel 22 on the deep side is not shown) are rotatably attached to the rear side parts of the vehicle body frame 11 via right and left suspending mechanisms 21 and 21 (the suspending mechanism 21 on the deep side is not shown). A front-side power transmitting mechanism 23 is provided for transmitting rotation of the engine 12 to the front wheels 18 and 18, and a rear-side power transmitting mechanism 24 is provided for transmitting rotation of the engine 12 to the rear wheels 22 and 22.

Also shown are a front fender 31, a head lamp 32, a front bumper 33, an undercover 34, a floor step 35, a rear fender 36, and a muffler 37. A vehicle speed sensor mounting structure 70, including a vehicle speed sensor 71, to be described later, is a structure capable of sufficiently protecting a vehicle speed sensor from flying gravel and the like. As can be seen in FIG. 1, the vehicle speed sensor 71 is disposed on the vehicle speed mounting structure 70 in a position inward of the undercover 34 so as to be readily mountable through the opening 77 between upper and side portions of the undercover 34 and the fender 31 of the vehicle, thereby being protected from road hazards.

Figure 2:
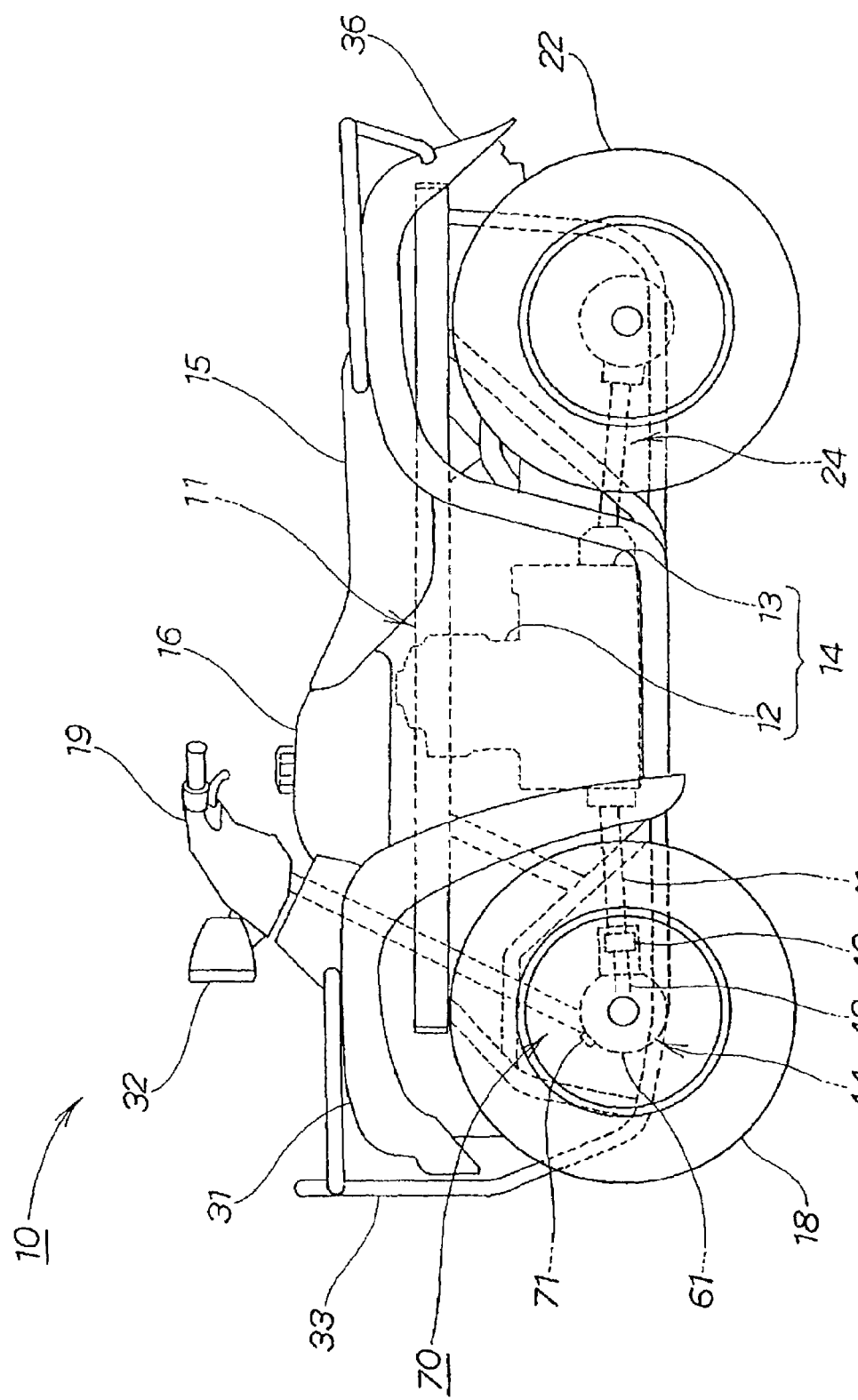
FIG. 2 is a side view of the vehicle employing the vehicle speed sensor mounting structure according to the present invention.

FIG. 2 is a side view of a vehicle employing the vehicle speed sensor mounting structure according to the invention. The front-side power transmitting mechanism 23 is a mechanism constructed by a drive axle 41 for transmitting an output of the engine 12 to drive the front wheels 18 and 18. An electromagnetic clutch 42 connects or disconnects the output of the drive axle 41. The front-side power transmitting mechanism 23 also includes a driven shaft 43 for receiving an output of the electromagnetic clutch 42, a final reduction gear 44 for connecting the driven shaft 43, and a vehicle speed sensor 71 being attached to the final reduction gear 44 to thereby detect the vehicle speed.

Specifically, the saddle-riding type vehicle 10 is a buggy of a two/four-wheel-drive type, and is a vehicle classified as an ATV (All Terrain Vehicle). The vehicle body is light and compact, and the vehicle can turn in a small space and is easily operated. Consequently, the vehicle is a dedicated off-road vehicle suitable for agriculture, stock farming, hunting, patrolling, and recreation.

Figure 3:
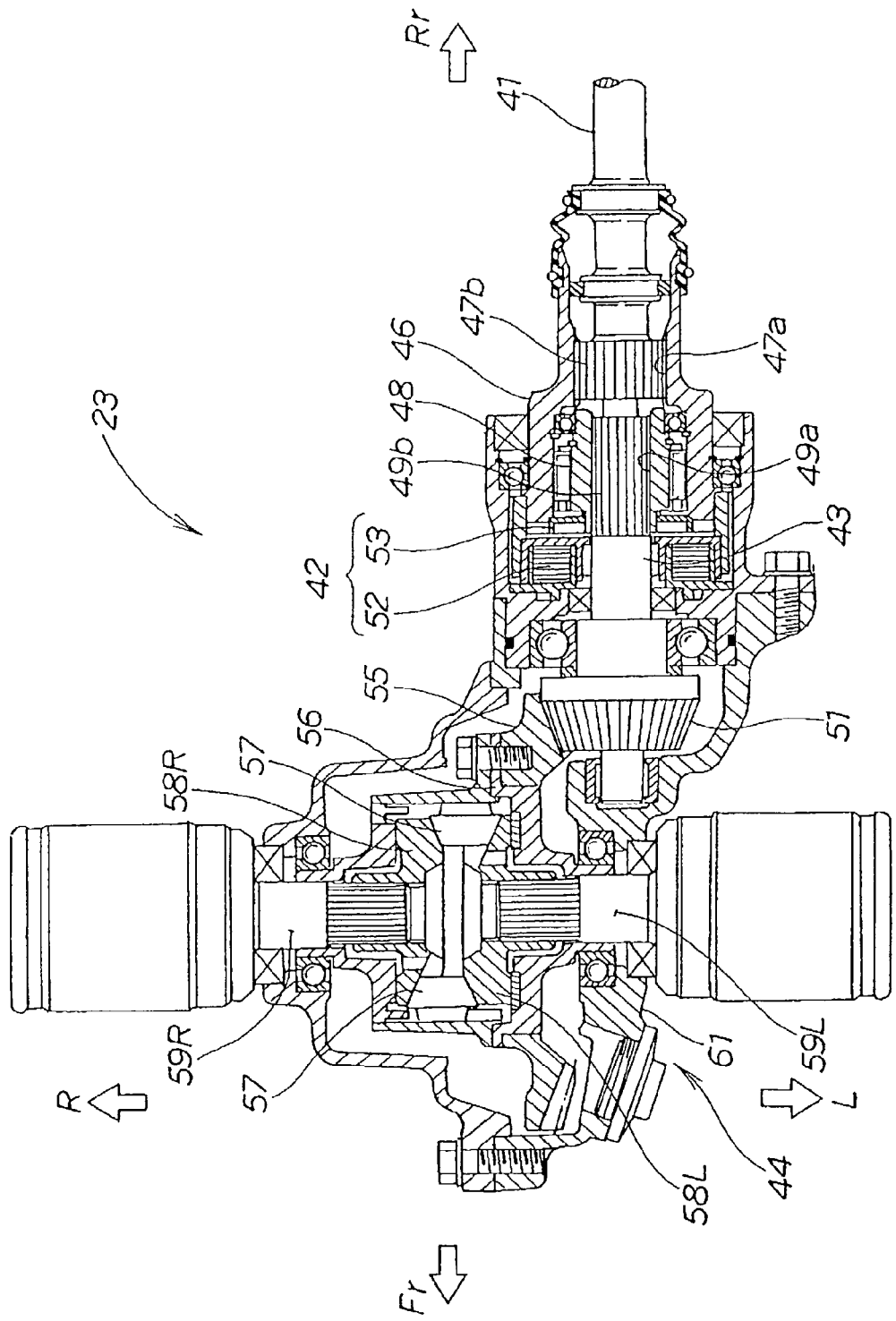
FIG. 3 is a cross section taken along line 3—3 of FIG. 1.

FIG. 3 is a cross section taken along line 3—3 of FIG. 1, which is a plan cross section of the front-wheel-side power transmitting mechanism 23 employing the vehicle speed sensor mounting structure 70 (refer to FIG. 1).

In the drive axle 41, an outer ring 46 is rotatably attached to a casing 61 of the final reduction gear 44. Splines 47a and 47b are formed at tips of the outer ring 46 and the drive axle 41, respectively, and are connected to each other.

In the driven shaft 43, an inner ring 48 is rotatably attached to the outer ring 46. Splines 49a and 49b are formed at one end of the inner ring 48 and the driven shaft 43, respectively, and connected to each other. The other end of the driven shaft 43 is rotatably attached to the casing 61, and a bevel gear 51 to be coupled to the final reduction gear 44.

The electromagnetic clutch 42 is a member for connecting/disconnecting the inner ring 48 of the driven shaft 43 to the outer ring 46 on the drive axle 41 side, and includes an electromagnetic coil 52 for turning on/off a controller (not shown), and a clutch disc 53 driven by the electromagnetic coil 52.

The final reduction gear 44 includes a final gear 55 engaged with the bevel gear 51, a gear case 56 attached to the final gear 55, a pair of pinions 57 and 57 attached to the gear case 56, and right and left side gears 58R and 58L engaged with the pinions 57 and 57. The final reduction gear 44 is a differential gear for transmitting an output from the engine 12 (refer to FIG. 1) to the right and left front wheels 18 and 18 by splining right and left axles 59R and 59L to right and left side gears 58R and 58L, respectively. Also shown in FIG. 3 is a cover 62 on the right side of the casing 61.

Figure 4:
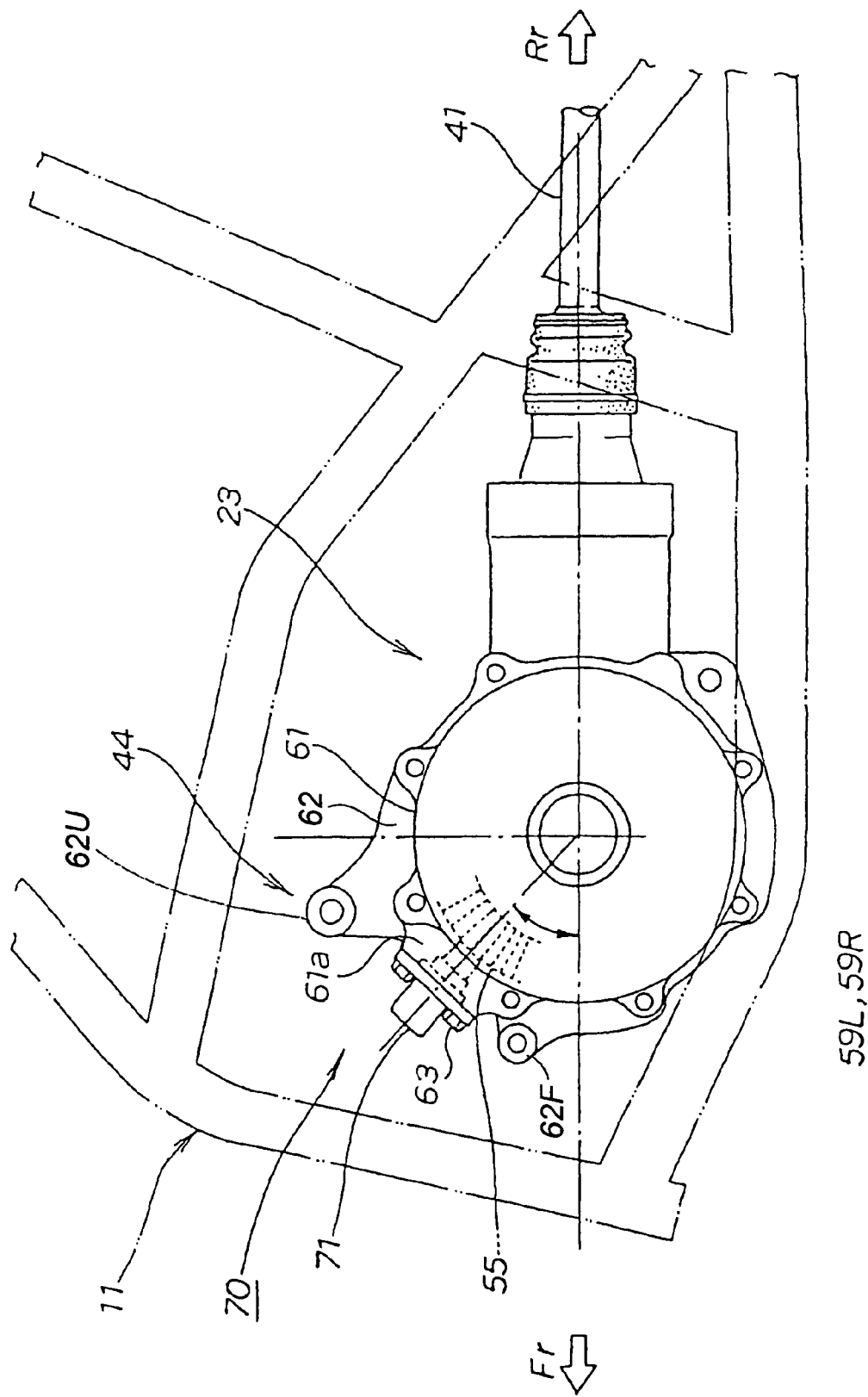
FIG. 4 is view seen from the arrow 4 in FIG. 1.

FIG. 4 is a side view shown from the arrow 4 of FIG. 1, of the power transmitting mechanism 23 on the front wheel 18 side (refer to FIG. 1) showing the vehicle speed sensor mounting structure 70 according to the invention. In the vehicle speed sensor mounting structure 70 of a vehicle, the engine 12 is suspended by the vehicle body frame 11 (refer to FIG. 1), an output from the engine 12 is transmitted to the final reduction gear 44, and an output from the engine 12 is transmitted from the final reduction gear 44 via axles 59L and 59R to the front wheels 18 and 18 (refer to FIG. 1). The rotational speed of the final gear 55 of the final reduction gear 44 is detected by the vehicle speed sensor 71, thereby detecting the vehicle speed. The vehicle speed sensor 71 is disposed higher than the center of the axles 59R and 59L, and facing to the outside of the vehicle (front part of the vehicle) with respect to the center of the axles 59R and 59L.

To detect the vehicle speed, the rotational speed of the final gear 55 of the final reduction gear 44 is detected by the vehicle speed sensor 71. However, if the vehicle speed sensor 71 were to be disposed lower than the center of the axles 59R and 59L, it would be apt to be hit by small stones and the like. In this case, the vehicle speed sensor 71 would need to be protected. Thus, in the present invention, the vehicle speed sensor 71 is disposed higher than the center of the axles 59R and 59L, and thus the vehicle speed sensor 71 is not as easily hit by small stones and the like. As shown in FIG. 4, the vehicle speed sensor 71 is attached by a pair of bolts 63 onto a protruding section 61a on the casing 61. It will be noted that forward most part 62F of the cover 62 and an uppermost part 62U of the cover 62 extend further forward and upward than the vehicle speed sensor, whereby the vehicle speed sensor 71 detects the rotational speed while being protected from road hazards.

Also, if the vehicle speed sensor 71 were to be disposed on the inner side of the vehicle from the center of the axles 59R and 59L, it could not be easily mounted, since it would be mounted on side of the power transmitting mechanism 23 way from the outside of the vehicle. With the present invention, the vehicle speed sensor 71 is mounted higher than the center of the axles 59R and 59L, and facing to the outside of the vehicle with respect to the center of the axles 59R and 59L. As can be seen in FIG. 4, with this configuration, the vehicle speed sensor 71 can be easily mounted onto the protruding section 61a of casing 61 using only two bolts 63. As a result, the flexibility in designing of mounting of the vehicle speed sensor 71 can be increased, and a member for protecting the vehicle speed sensor 71 can be omitted. Also, with the present invention, the number of parts required in the vehicle speed mounting structure can be reduced.

Also, if the vehicle speed sensor 71 were to be disposed on the inner side of the vehicle from the center of the axles 59R and 59L, it could not be easily mounted, since it would be mounted on side of the power transmitting mechanism 23 way from the outside of the vehicle. With the present invention, the vehicle speed sensor 71 is mounted higher than the center of the axles 59R and 59L, and facing to the outside of the vehicle with respect to the center of the axles 59R and 59L. With this configuration, the vehicle speed sensor 71 can be easily mounted. As a result, the flexibility in designing of mounting of the vehicle speed sensor 71 can be increased, and a member for protecting the vehicle speed sensor 71 can be omitted. Also, with the present invention, the number of parts required in the vehicle speed mounting structure can be reduced.

The action of the aforementioned vehicle speed sensor mounting structure 70 will now be described.

Figure 5A:
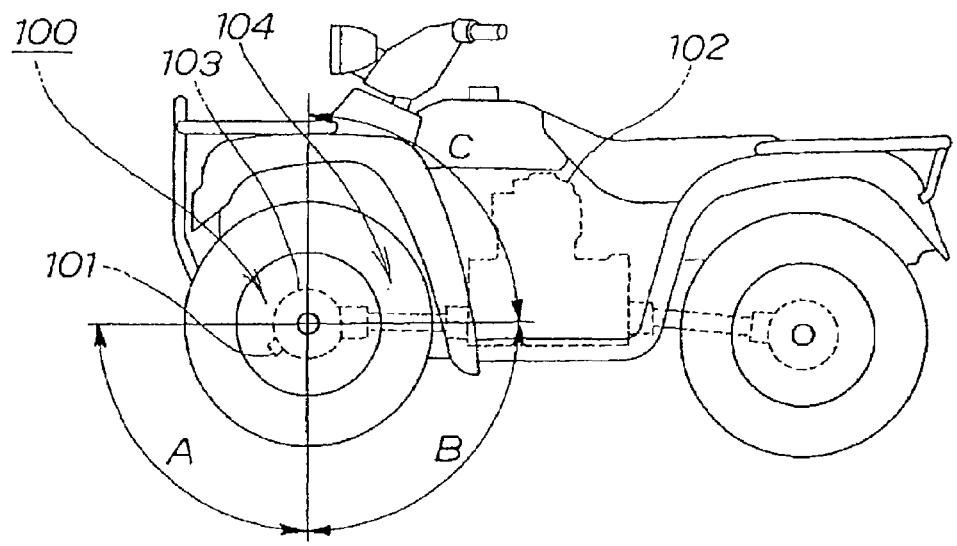
FIG. 5A shows a vehicle speed sensor mounting structure of a comparative example.
Figure 5B:
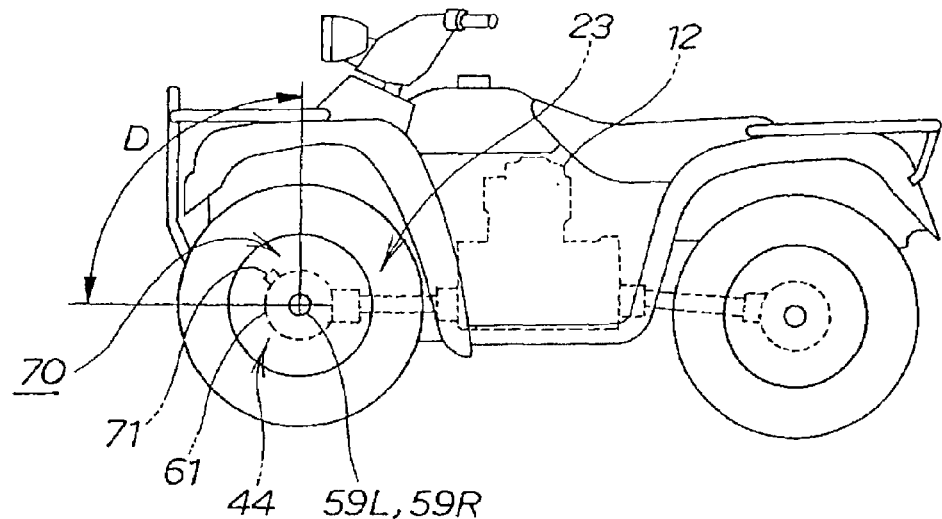
FIG. 5B is diagram for explaining the action of the vehicle speed sensor mounting structure according to the present invention.

FIGS. 5A and 5B are diagrams for explaining the action of the vehicle speed sensor mounting structure according to the invention. FIG. 5A shows a vehicle speed sensor mounting structure 100 of a comparative example, and FIG. 5B shows the vehicle speed sensor mounting structure 70 of one embodiment of the present invention.

In FIG. 5A, in the case where the vehicle speed sensor 101 is disposed in an area A, it is often hit by small stones and the like, so that the vehicle speed sensor 101 has to be protected. In the case of disposing the vehicle speed sensor 101 in an area B, it is often hit by small stones and the like, so that the vehicle speed sensor 101 has to be protected. Moreover, due to the existence of the power transmitting mechanism 104 for transmitting an output from the engine 102 to the final reduction gear 103, the vehicle speed sensor 101 is not easily mounted. Further, in the case of disposing the vehicle speed sensor 101 in an area C, the vehicle speed sensor 101 can be prevented from being hit by small stones and the like. However, due to the existence of the power transmitting mechanism 104 for transmitting an output of the engine 102 to the final reduction gear 103, the vehicle speed sensor 01 is difficult to mount and access.

In FIG. 5B, therefore, by disposing the vehicle speed sensor 71 higher than the axles 59R and 59L and near to the outside of the vehicle with respect to the center of the axles 59R and 59L (vehicle front part), the vehicle speed sensor 71 can be accessed and mounted. As a result, the flexibility in designing of mounting of the vehicle speed sensor 71 can be increased, a member for protecting the vehicle speed sensor 71 can be omitted, thus reducing the number of parts required.

Although the vehicle speed sensor mounting structure 70 in which the vehicle speed sensor 71 is attached around the front-wheel side power transmitting mechanism 23 as shown in FIG. 3 and described above, the present invention is not limited to the structure. Alternatively, a vehicle speed sensor mounting structure in which a vehicle speed sensor is attached around a rear-wheel side power transmitting mechanism may be used.

The present invention produces the following effects.

The vehicle speed sensor mounting structure includes a vehicle body frame for suspending an engine. The engine is connected to a final reduction gear for transmitting the output of the engine to wheels via an axle. A vehicle speed sensor detects the rotational speed of a final gear of the final reduction gear, thereby detecting vehicle speed. The vehicle speed sensor is disposed higher than the center of the axle and near to the outside of the vehicle with respect to the center of the axle. Consequently, the vehicle speed sensor can be disposed by an easy mounting structure. As a result, the flexibility in designing of mounting of the vehicle speed sensor can be increased, and a member for protecting the vehicle speed sensor can be omitted, thus reducing the number of parts required in the vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle speed sensor mounting structure of a vehicle, comprising:
   a final reduction gear for transmitting an output from an engine suspended by a vehicle body frame to wheels via an axle at a longitudinal end of the vehicle, the final reduction gear having a casing and a cover attached to one side of the casing;
   a vehicle speed sensor mounted on the final reduction gear for detecting a rotational speed of a final gear of the final reduction gear, and thereby detecting vehicle speed,
   wherein the vehicle speed sensor is disposed on the casing in a position higher than a center of said axle and facing away from an engine of the vehicle and toward the longitudinal end of the vehicle, so that the sensor is protected from road hazards, and
   wherein a first part of the cover extends upwardly further than the vehicle speed sensor extends, and a second part of the cover extends further toward the longitudinal end of the vehicle than the vehicle speed sensor extends,
   the first part, the second part, and the vehicle speed sensor each being positioned upwardly and further toward the longitudinal end of the vehicle than where the center of said axle is positioned.

2. The vehicle speed sensor mounting structure of a vehicle according to claim 1, wherein the cover is attached to a right side of the casing.

3. A vehicle speed sensor mounting structure of a vehicle, comprising:
   a vehicle body frame for suspending an engine;
   a final reduction gear for transmitting an output from the engine to front wheels via an axle, the final reduction gear having a casing and a cover attached to one side of the casing;
   a vehicle speed sensor mounted on the casing for detecting a rotational speed of a final gear of the final reduction gear, and thereby detecting vehicle speed,
   wherein the vehicle speed sensor is disposed on the casing in a position higher than a center of said axle and facing a front of the vehicle with respect to the center of the axle, the position facing way from an engine of the vehicle, and
   wherein a forward most part and an uppermost part of the cover extends further forwardly and upwardly, respectively, than the vehicle speed sensor extends, so that the sensor is protected from road hazards, and
   wherein each of the forward most part, the upper most part, and the vehicle speed sensor is positioned upwardly and forwardly with respect to the center of said axle.

4. The vehicle speed sensor mounting structure of a vehicle according to claim 3, wherein the cover is attached to a right side of the casing.

5. A vehicle speed sensor mounting structure of a vehicle, comprising:
- a vehicle body frame for suspending an engine of the vehicle;
- a power transmitting mechanism for transmitting an output from an engine suspended by a vehicle body frame to wheels via an axle, the power transmitting mechanism having a casing, the power transmitting mechanism having a casing and a cover attached to one side of the casing;
- a vehicle speed sensor for detecting a rotational speed of a final gear of the power transmitting mechanism mounted on the casing in a position facing upward and away from an engine of the vehicle,
- the vehicle speed sensor being attached to the casing by a pair of bolts on opposite sides of the sensor, the sensor and the bolts each having a longitudinal axis which is oriented at an angle substantially equal to 45° with respect to a length and a height of the vehicle, the vehicle speed sensor being disposed higher than a forward most part of the cover and lower than an uppermost part of the cover,
- each of the forward most part, the upper most part, and the vehicle speed sensor being positioned upwardly and forwardly with respect to the center of said axle,
- whereby the vehicle speed sensor detects the rotational speed while being protected from road hazards.

6. The vehicle speed sensor mounting structure of a vehicle according to claim 5, wherein the cover is attached to a right side of the.

* * * * *